United States Patent
Ferrell

(10) Patent No.: US 6,285,993 B1
(45) Date of Patent: Sep. 4, 2001

(54) METHOD AND APPARATUS FOR MODELING INDIVIDUAL LEARNING STYLES

(75) Inventor: Joe G. Ferrell, Arlington, TX (US)

(73) Assignee: Raytheon Company, Lexingon, MA (US)

(*) Notice: Subject to any disclaimer, the term of this patent is extended or adjusted under 35 U.S.C. 154(b) by 0 days.

(21) Appl. No.: 09/088,171

(22) Filed: Jun. 1, 1998

(51) Int. Cl.[7] .................................................. G06F 17/00
(52) U.S. Cl. .......................... 706/45; 706/47; 434/322; 434/365
(58) Field of Search ................... 706/45, 47; 434/322, 434/365

(56) References Cited

U.S. PATENT DOCUMENTS

| | | | |
|---|---|---|---|
| 4,985,697 | * | 1/1991 | Boulton .................................. 706/927 |
| 5,122,952 | * | 6/1992 | Minkus .................................... 705/26 |
| 5,387,104 | * | 2/1995 | Corder .................................... 704/270 |
| 5,577,919 | * | 11/1996 | Collines et al. ...................... 434/322 |
| 5,727,950 | * | 3/1998 | Cook et al. . | |
| 5,810,599 | * | 9/1998 | Bishop .................................. 434/157 |
| 5,820,386 | * | 10/1998 | Sheppard, II ....................... 434/322 |
| 5,879,165 | * | 11/1999 | Brunkow et al. ................... 434/322 |
| 5,904,485 | * | 5/1999 | Stiefert ................................. 434/322 |
| 6,039,575 | * | 3/2000 | Liallier et al. ....................... 434/323 |

OTHER PUBLICATIONS

Susan M. Montgomery, "Addressing Diverse Learning Styles Through the use of Multimedia", IEEE Proceedings on Frontiers in Education Conference, Nov. 1995.*

Zhang et al, "Multimedia Courseware Delivery over the Internet", IEEE conference on Electrical and Computer Engineering, May 1998.*

Rafe et al., "Learning Style and Instructional Methods in Graduate Level Engineering Program Delivered by Video Teleconferencing Technology", IEEE Proceedings of the 27th Annual conference on Frontiers in Education, Nov. 1997.*

* cited by examiner

Primary Examiner—George B. Davis
(74) Attorney, Agent, or Firm—Baker Botts L.L.P.

(57) ABSTRACT

A method is disclosed for automatically gathering information from an individual and using the information to model that individual's learning style. The method is preferably embodied in a programmable computer having a display, a processor, a variety of output devices and a variety of input devices. The display and the output devices communicate inquiries to the individual in a variety of forms, including both visual communications and non-visual communications, and the individual may select whether he/she prefers to receive communications in a visual or non-visual format. The input devices receive the individual's responses to the inquiries via a variety of media, including keyboards, point-and-click devices or speech recognition devices, and the individual may select any of the available media to input his/her responses. The processor gathers the individual' responses, along with information on the individual's preferences for how he/she receives communications and provides inputs, and uses the aforementioned information to generate a learning style profile and/or a learning style profile report, said learning style report including suggestions for enhancing the individual's learning.

18 Claims, 15 Drawing Sheets

| | DISPOSITION | | | | | | | |
|---|---|---|---|---|---|---|---|---|
| ATTITUDE | | TENACITY | | CONFORMITY | | FRAMEWORK | | |
| 5.1 | 5.2 | 6.1 | 6.2 | 7.1 | 7.2 | 8.1 | 8.2 | |
| MOTIVATED | NOT MOTIVATED | PERSISTENT | NOT PERSISTENT | CONFORMS | NON-CONFORMIST | SELF STRUCTURES | NEEDS STRUCTURE | |
| A | G | A | G | A | G | A | G | |

FIG. 15

METHOD AND APPARATUS FOR MODELING INDIVIDUAL LEARNING STYLES

BACKGROUND OF THE INVENTION

(a) Field of the Invention

The present invention relates in general to the analysis of how individuals receive, process and understand information. More particularly, it relates to learning models that use a wide range of input variables to analyze and determine the best methods by which individuals receive, process and understand information, thereby optimizing individual and/or group learning.

(b) Description of Related Art

People tend to differ widely in how they best receive and process information. For example, if a group of people are learning about ceramics in a classroom setting, one individual may best understand and process the information by listening to the instructor lecture. Another student may prefer to read the textbook, while still another may understand and retain the most information when they see photographs or diagrams illustrating the concepts. Others still may prefer an early morning class to an afternoon or evening class, or prefer studying in a large comfortable chair in a brightly lit room while listening to classical music.

The extent to which an individual receives sensory information in a format and setting that is compatible with how they best process information goes a long way towards determining how well that person learns. Formats and settings that deviate somewhat from a person's ideal can degrade that person's ability to learn. Formats and/or settings that deviate significantly from a person's ideal can actually prevent the person from learning. This situation can be seen in many schools where some children fail to learn, not because they do not have the intelligence to understand and process the lessons, but because the instruction is presented in a format and/or setting that deviates significantly from the particular child's ideal.

A considerable amount of research has been devoted to identifying a person's "learning style", i.e., the various formats, environmental settings and other variables that are most compatible with how that person best understands and processes sensory information. So-called "learning style models" have been developed in which specific and varied information is gathered from an individual and used to extrapolate that person's learning style. The information may be gathered through direct observation of the person, paper and pen questionnaires, pencil-based answer sheets of the type that can be scanned into a computer scoring system, or computer assisted questionnaires in which the user answers the various test questions as they are presented on the computer screen. The questionnaires generally include a range of possible answers such as always, usually, sometimes, rarely and never.

The questionnaire answers are then analyzed, either manually or by computer, to produce a learning style profile. The learning style profile is then analyzed, again either manually or by computer, to produce a learning style report. Under the manual analysis technique, an individual specifically trained in the particular learning style model must interpret the profile in order to generate a report. Under a computer analysis technique, the profile data must be re-entered in order to produce the report. In either case, the learning style report identifies individual learning factors and may include suggestions for learning enhancements.

The above-described learning style model questionnaires can be extremely tedious for the person taking the test. In particular, they are typically lengthy and require good silent reading and comprehension skills and a long attention span in order to render relevant information. The options for administering any given questionnaire, or for analyzing questionnaire results, are generally limited and not very flexible. Accordingly, there is a need for a more flexible and user-friendly method of administering learning style model questionnaires and analyzing the results thereof.

SUMMARY OF THE INVENTION

The present invention provides a method and apparatus for gathering information related to individual learning styles that overcome the above-referenced shortcomings of known systems by providing an automated, more flexible and more user-friendly method of gathering learning style information in the form of a survey, and analyzing the results thereof. The method and apparatus are preferably embodied in a programmable computer that automatically and interactively administers the survey and analyzes the answers and the results. The computer preferably includes a display, a processor, a variety of output devices and a variety of input devices. The display and the output devices communicate inquiries to the individual in a variety of forms, including both visual communications and non-visual communications, and the individual may select whether he/she prefers to receive communications in a visual or non-visual format. The input devices receive the individual's responses to the inquiries via a variety of media, including keyboards, point-and-click devices or speech recognition devices, and the individual may select any of the available media to input his/her responses. The processor gathers the individual' responses, along with information on the individual's preferences for how he/she receives communications from the computer and provides inputs to the computer, and uses the aforementioned information to generate a learning style profile report and/or a learning style strategies report, said learning strategies including suggestions for enhancing the individual's learning.

Accordingly, the present invention may be embodied in an apparatus for modeling a person's learning style, wherein the apparatus includes a display, a first output device, a first input device, a second input device and a processor. The display provides visual communications that include inquiries that measure the person's learning style. The visual communications can include text, graphics, still pictures or moving pictures. The first output device provides non-visual communications that include inquiries that measure the person's learning style. The non-visual communications can include sound. The first input device receives inputs from the person, and these inputs include the person's responses to the inquiries. The second input device also receives inputs from the person, and these inputs also include responses to the inquiries. The processor is programmed with code capable of directing the processor through various steps including: generating the inquiries related to learning style; providing the inquiries to the display for visual communication of the inquiries to the person; providing the inquiries to the first output device for non-visual communication of the inquiries to the person; receiving from the first input device inputs from the person in response to the inquiries; and receiving from the second input device inputs from the person in response to the inquiries.

In another aspect of the present invention, the above-described processor is further programmed to receive from the first input device or the second input device a communication-selection-input made by the person. The processor uses the communication-selection-input to determine whether to provide the inquiries as either a visual communication at the display or a non-visual communication at the first output device.

The above-described processor may be further programmed to monitor the display, the first output device, the first input device and the second input device to gather information about the person's preferences for how he/she receives communications from the apparatus and how he/she provides inputs to the apparatus. The processor uses the information gathered from monitoring the display, the first output device, the first input device and the second input device in modeling the person's learning style.

In yet another aspect of the present invention, the above-described processor uses the inputs from the person to automatically generate a learning style profile report of the person, and/or a learning style strategies report for the person. The learning style strategies include suggestions for enhancing the person's learning.

In yet another aspect of the present invention the above-referenced apparatus is used to gather responses for a plurality of persons, and the processor uses the responses from the plurality of persons to automatically generate a group instruction strategy for providing instruction to the plurality of persons in a group setting.

The present invention may also be embodied in a method of modeling learning styles, the steps including: displaying visual communications comprising inquiries that measure a person's learning style; providing non-visual communications comprising inquiries that measure the person's learning style; receiving a first type of input from the person, wherein the first type of input comprises responses to the inquiries; and receiving a second type of input from the person, wherein the second type of input comprises responses to the inquiries.

In one aspect of the invention, the above-described method includes the step of using a communication-selection-input made by the person to determine whether to provide the inquiries as either a visual communication or a non-visual communication. The method may further include the step of gathering information about the person's preferences for how the person receives communications and how the person provides inputs. The aforementioned gathered information, along with the person's response to the inquiries may be used in generating a learning style profile report and/or a learning style strategies report of the person.

In yet another aspect of the invention, the above-described method may be applied to a plurality of persons, and the inputs from the plurality of persons may be used to generate a group instruction strategy for instructing the plurality of persons in a group setting.

The present invention may further be embodied in a method of posing learning-style-inquiries to one or more person's, wherein the inquiries are designed to evaluate the person's learning style, and the steps comprise using a programmable computer to: request the person to enter into the computer information identifying the person; communicate to the person an explanation of the learning style inquiries; communicate to the person more than one option for how the computer communicates with the person; receive from the person a selection of how the computer should communicate with the person; communicate to the person more than one option for entering into the computer the person's answers to the inquiries; communicate to the person the learning style inquiries; and receive from the person answers to the learning style inquiries. The computer automatically uses the answers to the inquiries to generate a learning style profile report and/or a learning style strategy report for the person.

The above-described computer may further be used to monitor the person's selection of how the computer communicates with the person, and monitor which of the more than one option the person uses when entering into the computer the person's answers to the inquiries. The computer uses information gathered from said monitoring to model the person's learning style.

The above-described computer may further be used to receive answers to said inquiries from a plurality of persons and generate a group instruction strategy for instructing said plurality of persons in a group setting.

Thus, it can be seen that the present invention provides several advantages. The method not only measures behavioral traits selections made by the user, but also the selection methods. For example, the user may make selections by clicking on a graphic, clicking on text, typing on a keyboard or speaking through a microphone. The method measures the method of selection, sequence of selection, preference of screen presentation and whether the user selects the same way for each screen or varies the method. The material for evaluation is presented as a graphic with supporting speech, as a graphic with speech and a text caption, or as text only (with or without supporting speech). The user can respond to the survey using speech, mouse selection of graphic, mouse selection of text caption, mouse selection of narrative text or keyboard typing. The user may vary the response mode while taking the survey. The method uses the survey responses to generate strategy reports enabling the individual to adapt to a variety of classroom instructional styles; an instructor report provides specific teaching strategies for a particular mixture of classroom students; the supervisor report details specific communication methods for workers, enhancing communication.

The method uses rules-based algorithms to automatically produce strategies from user responses and selection methods. The detail material does not have to be re-entered into another program to produce learning strategies, as is the case with known methods that focus on questionnaire-type techniques.

The invention itself, together with further objects and attendant advantages, will best be understood by reference to the following detailed description, taken in conjunction with the accompanying drawings.

BRIEF DESCRIPTION OF THE DRAWINGS

FIG. 15 is a table illustrating how the scoring process stores individual answers according to the present invention.

DESCRIPTION OF THE PREFERRED EMBODIMENTS

By way of example only, the method and apparatus of the present invention will be described below in connection with a particular example that uses a personal computer to administer a series of learning style inquiries to one or more individuals. The disclosed computer uses a variety of communications formats (e.g., speech, text, graphics, moving and still pictures, etc.) to administer questions and receive the answers thereto. However, a wide variety of communications formats are applicable to the method and apparatus disclosed herein.

Figure 1:
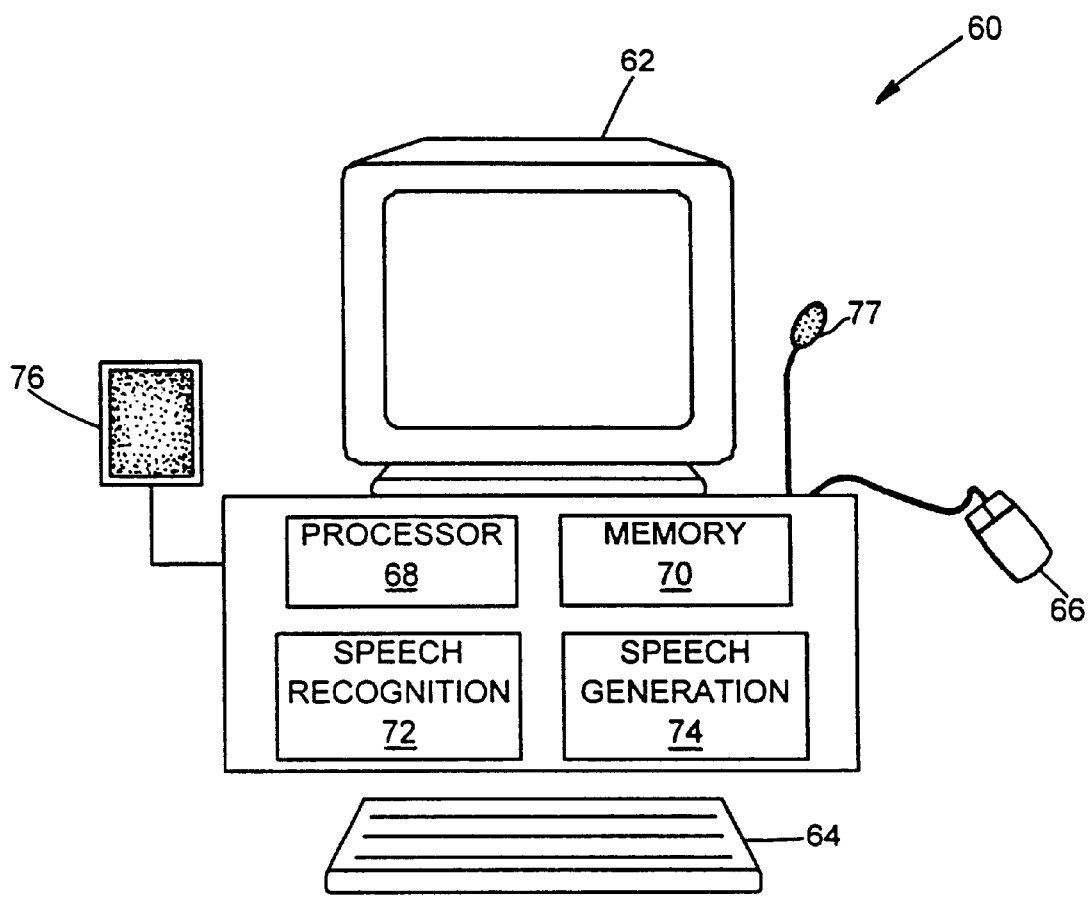
FIG. 1 shows a computer and monitor representing one embodiment of the apparatus of the present invention.

FIG. 1 illustrates a computer 60 capable of implementing the present invention. The computer 60 includes a monitor/display 62, a keyboard 64, a point-and-click device (a.k.a. "mouse") 66, a processor 68, memory 70, a speech recognition unit 72, a speech generation unit 74, a loudspeaker 76 and a microphone 77.

Figure 2:
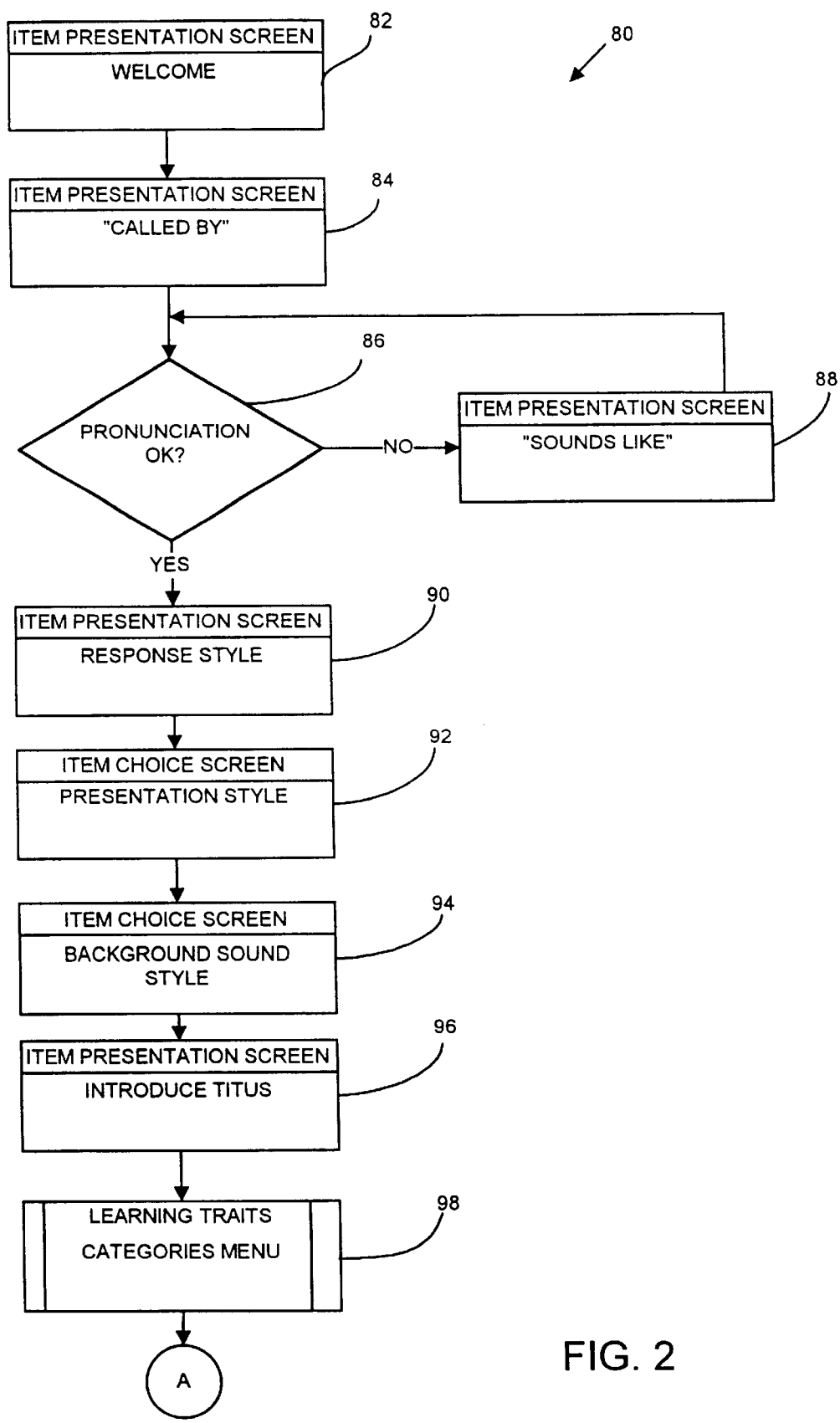
FIGS. 2–4 show a flow chart representing one embodiment of the method of the present invention. The method is carried out by the computer and monitor shown in FIG. 1.
Figure 3:
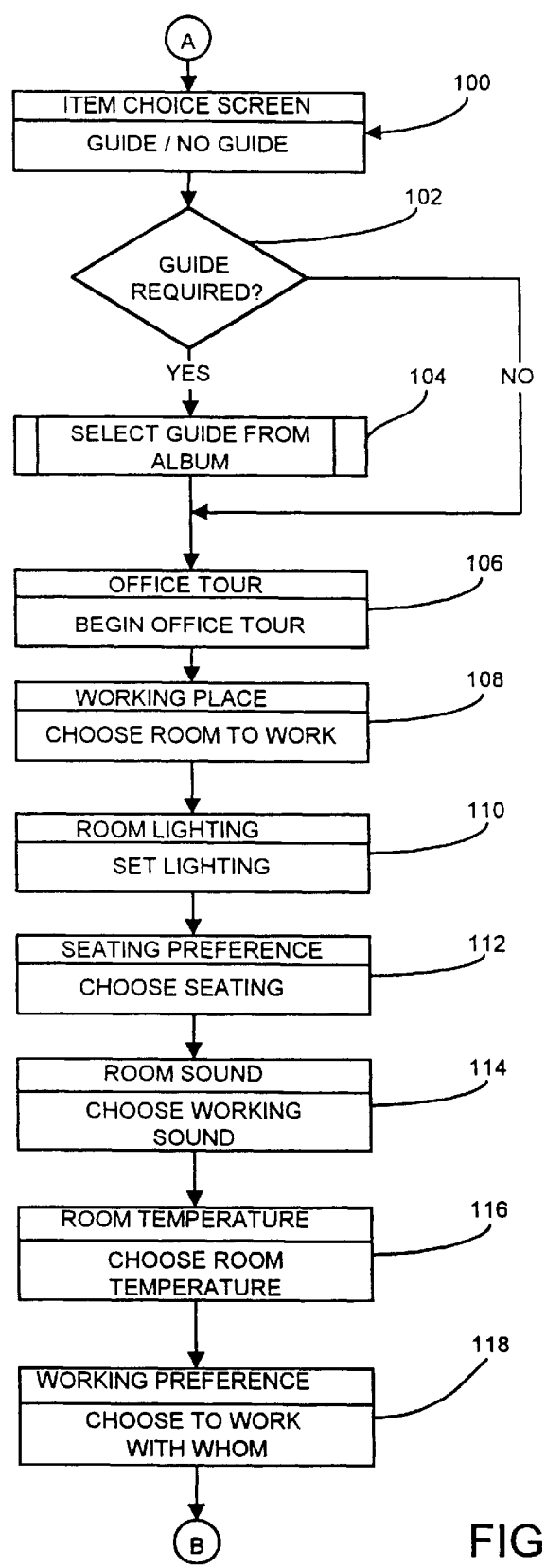
Figure 4:
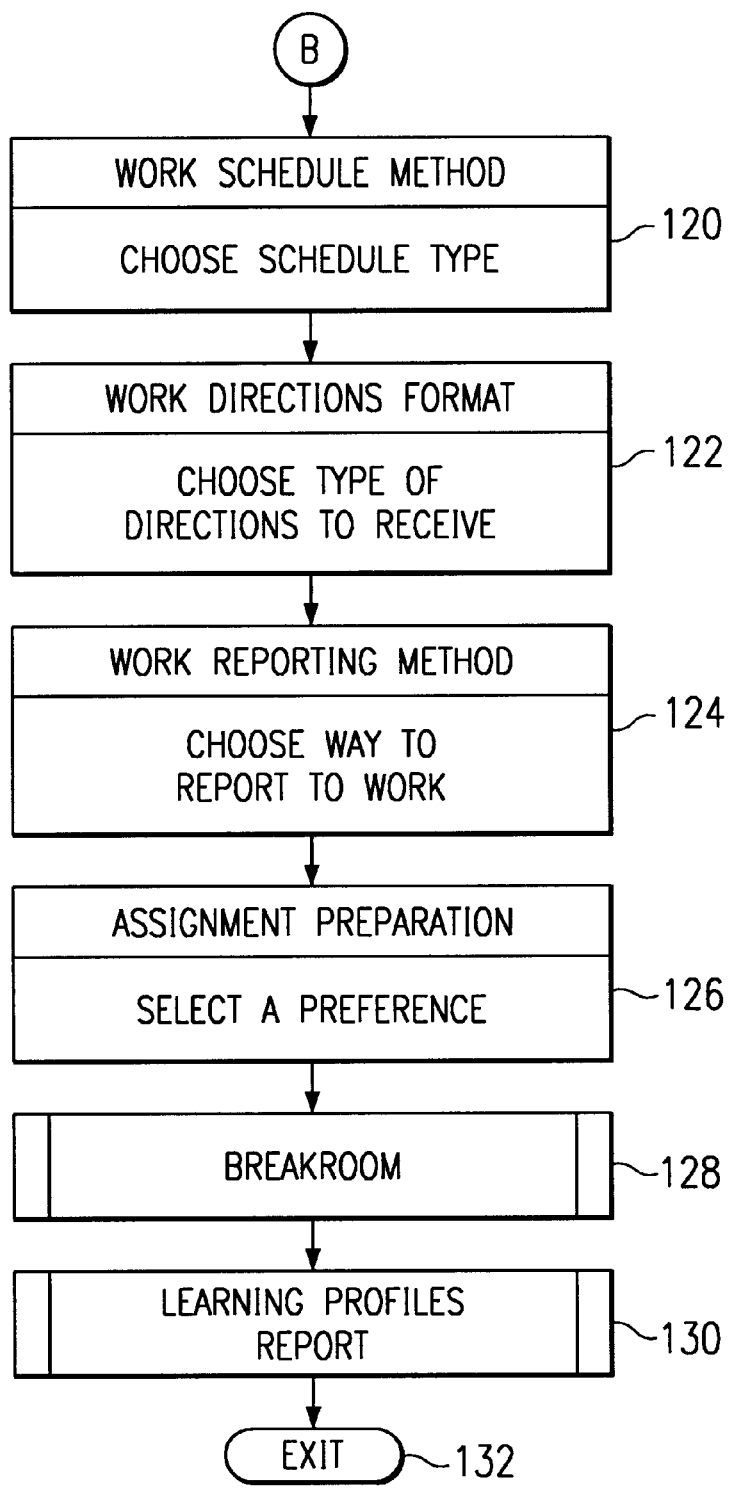

FIGS. 2–4 illustrate a flowchart representing one embodiment of the method of the present invention, wherein the method may be implemented as a computer program 80 that is carried out by the computer 60 shown in FIG. 1. The program 80 begins at block 82 by issuing a welcome to the person sitting in front of the computer 60. The welcome may take a variety of forms, including visual graphics, text, moving or still pictures, and/or audible communications that welcome the person to the system. In block 84, the program 80 prompts the person to enter his or her name. The program 80 confirms the proper pronunciation of the name by saying it. If the name is not pronounced correctly, the program 80 offers more prompts until the name is pronounced to the satisfaction of the person. These steps are reflected in blocks 86 and 88.

In block 90, the program 80 explains to the person the nature of the survey and the options for responding. These options may include speaking, using the point and click device to click on an image or a printed word, or typing on a keyboard. The user is given the option to change the response style at any point during the program. At block 92, the program 80 informs the user that information may be presented as images, still pictures, moving pictures, graphics or printed words in text, then asks the user for his/her preference. In block 94, the program 80 gives the user the option to hear background music throughout the program. The user is given the opportunity to sample the music before finalizing their decision. In block 96, the learn style survey to be administered by the program 80 is defined to the user in additional detail. The user is informed that the questions are designed to determine their learning style (through the use of various types of inquiries) and explains the value of that information. It also details additional information to be gained from participating in the survey.

Figure 5:
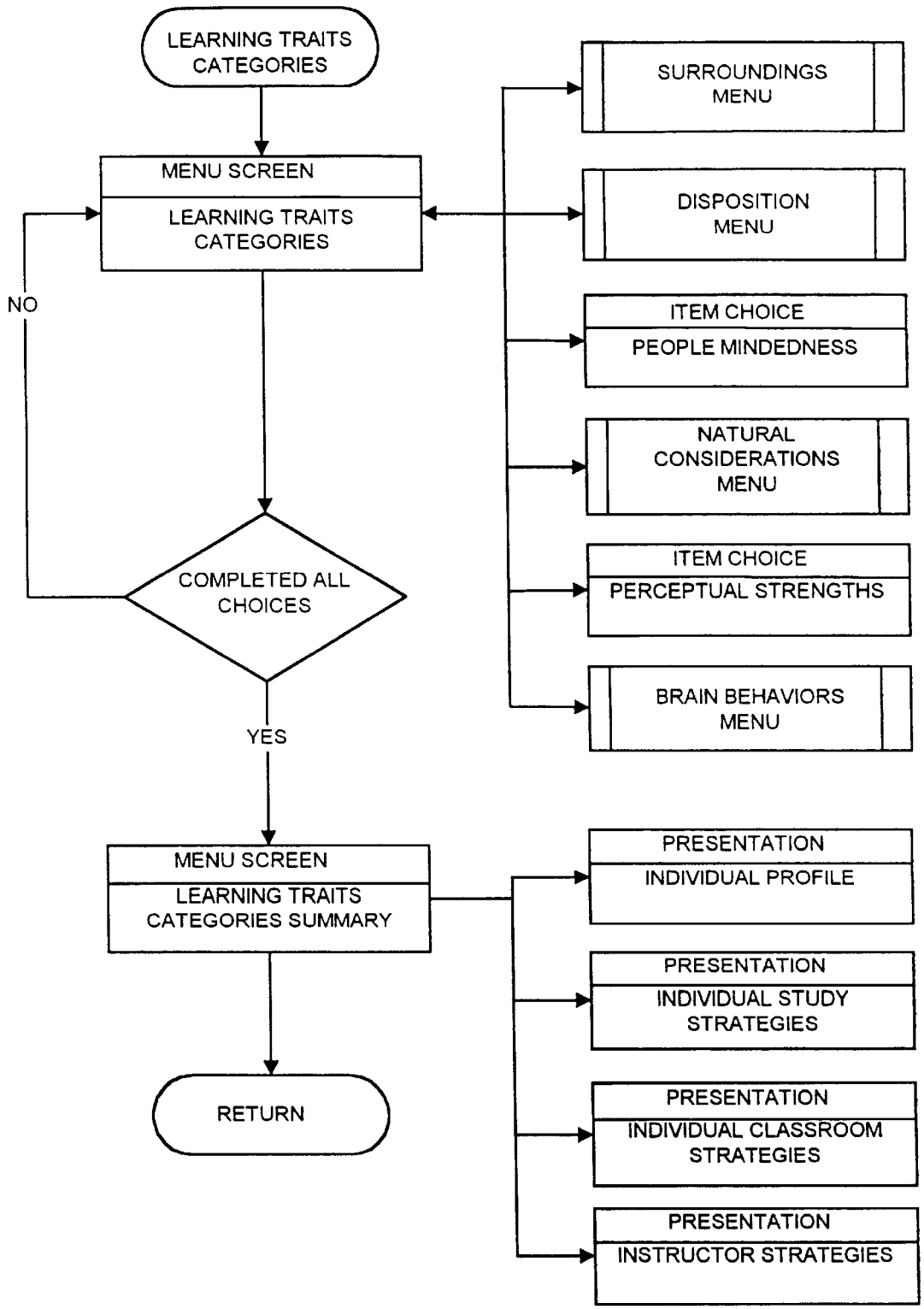
FIG. 5 is a flow chart illustrating the "learning traits categories" menu referenced in the flow chart of FIG. 2.
Figure 6:
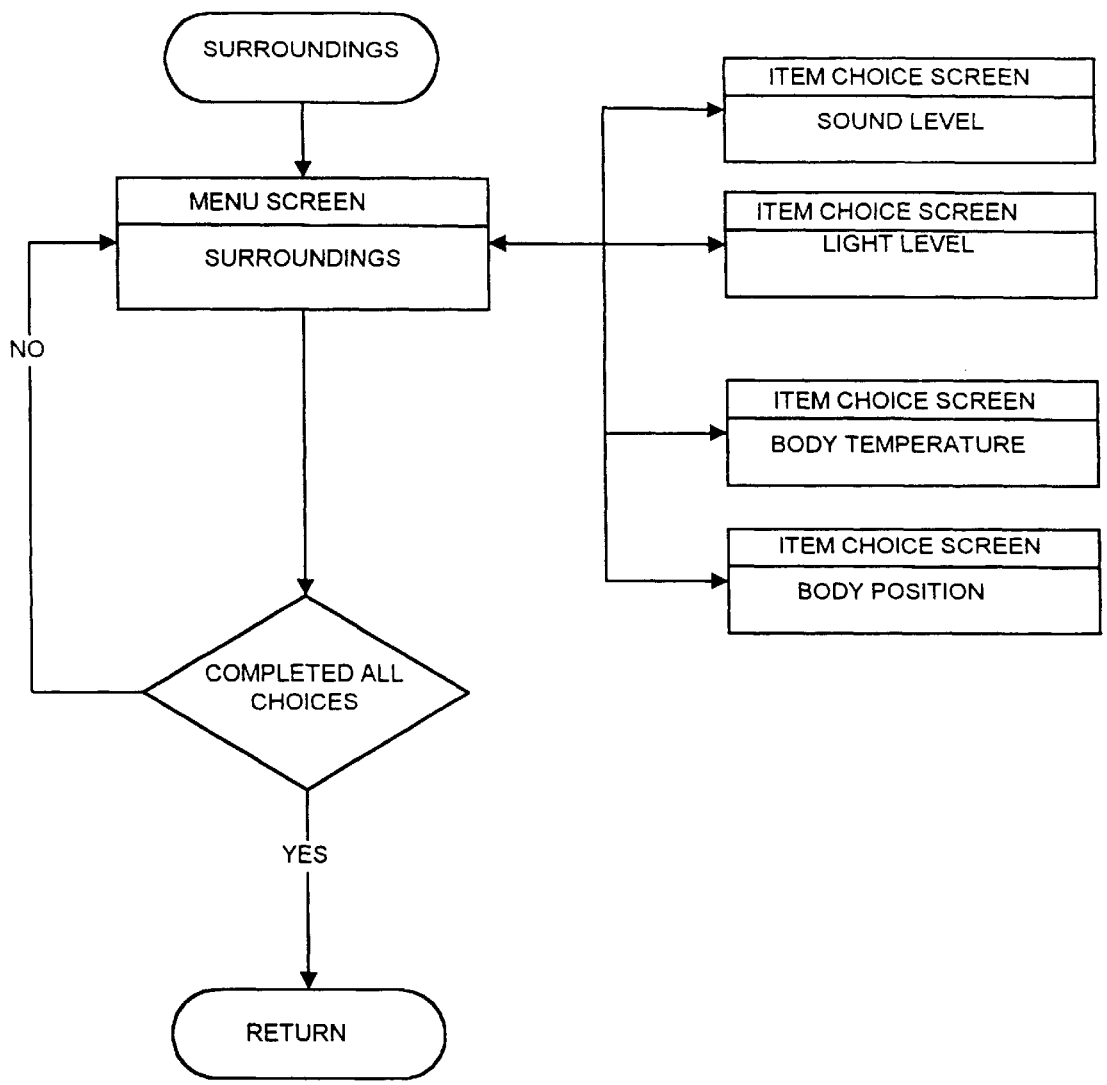
FIG. 6 is a flow chart illustrating the "surroundings" menu referenced in the flow chart of FIG. 5.
Figure 7:
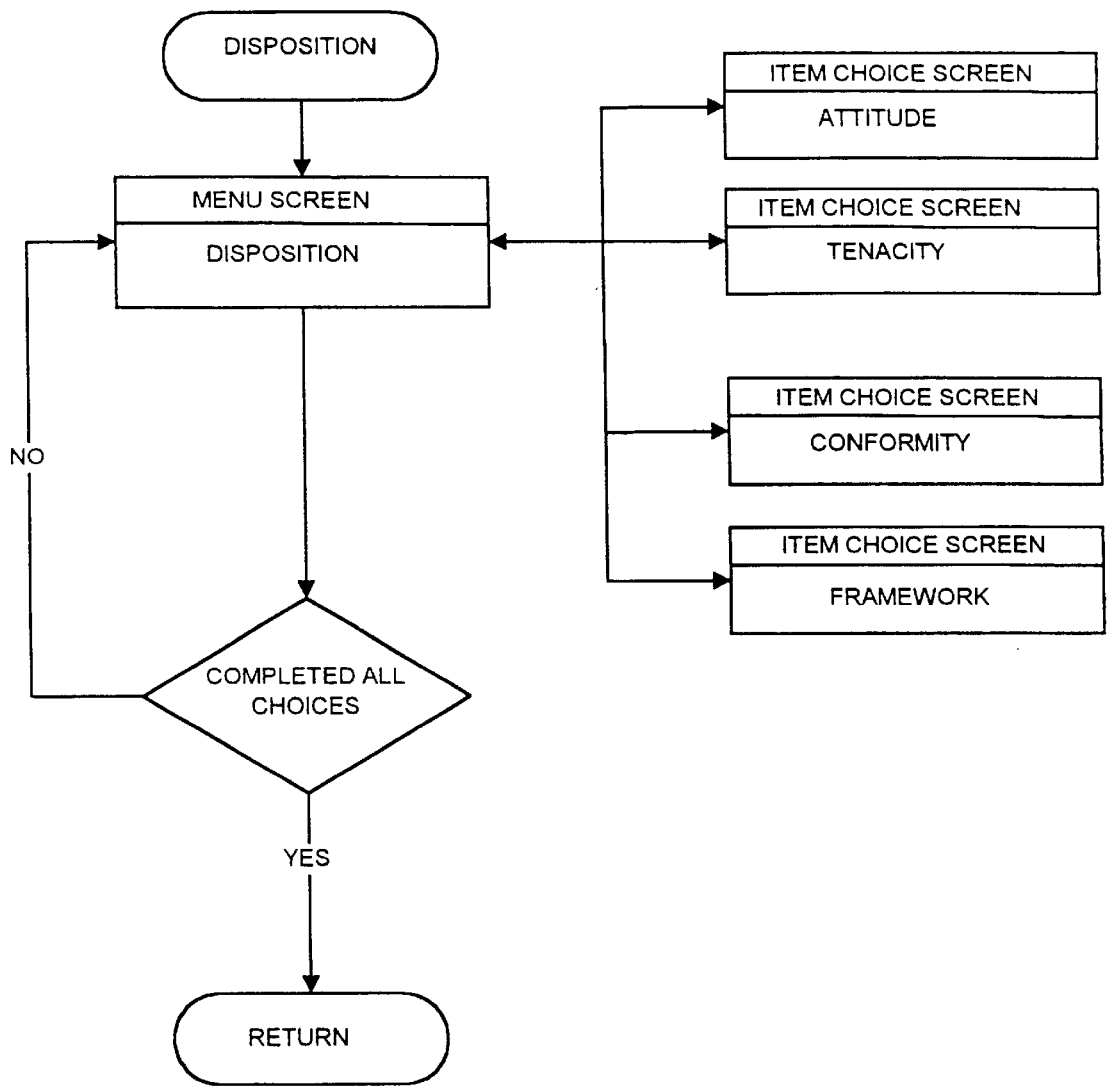
FIG. 7 is a flow chart illustrating the "disposition" menu referenced in the flow chart of FIG. 5.
Figure 8:
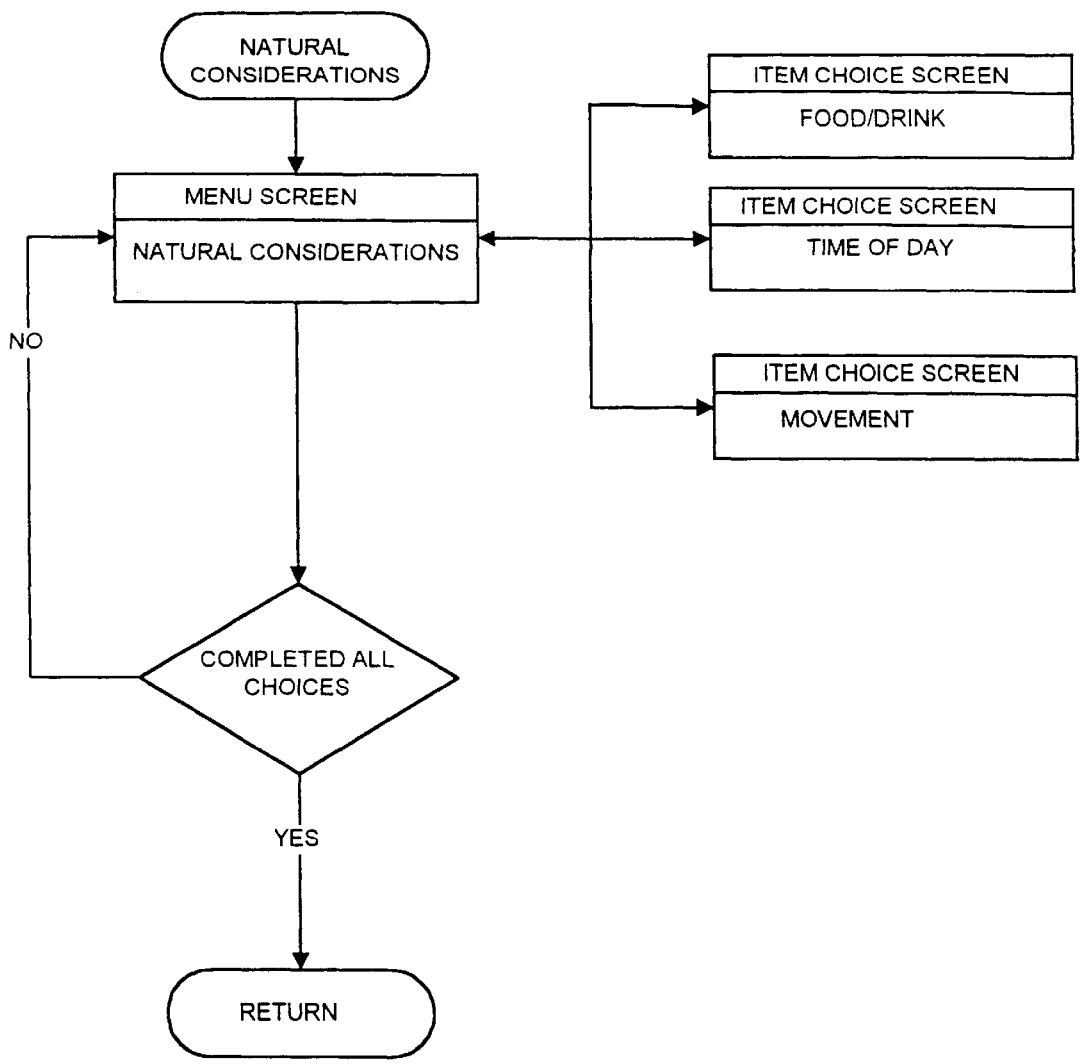
FIG. 8 is a flow chart illustrating the "natural considerations" menu referenced in FIG. 5.
Figure 9:
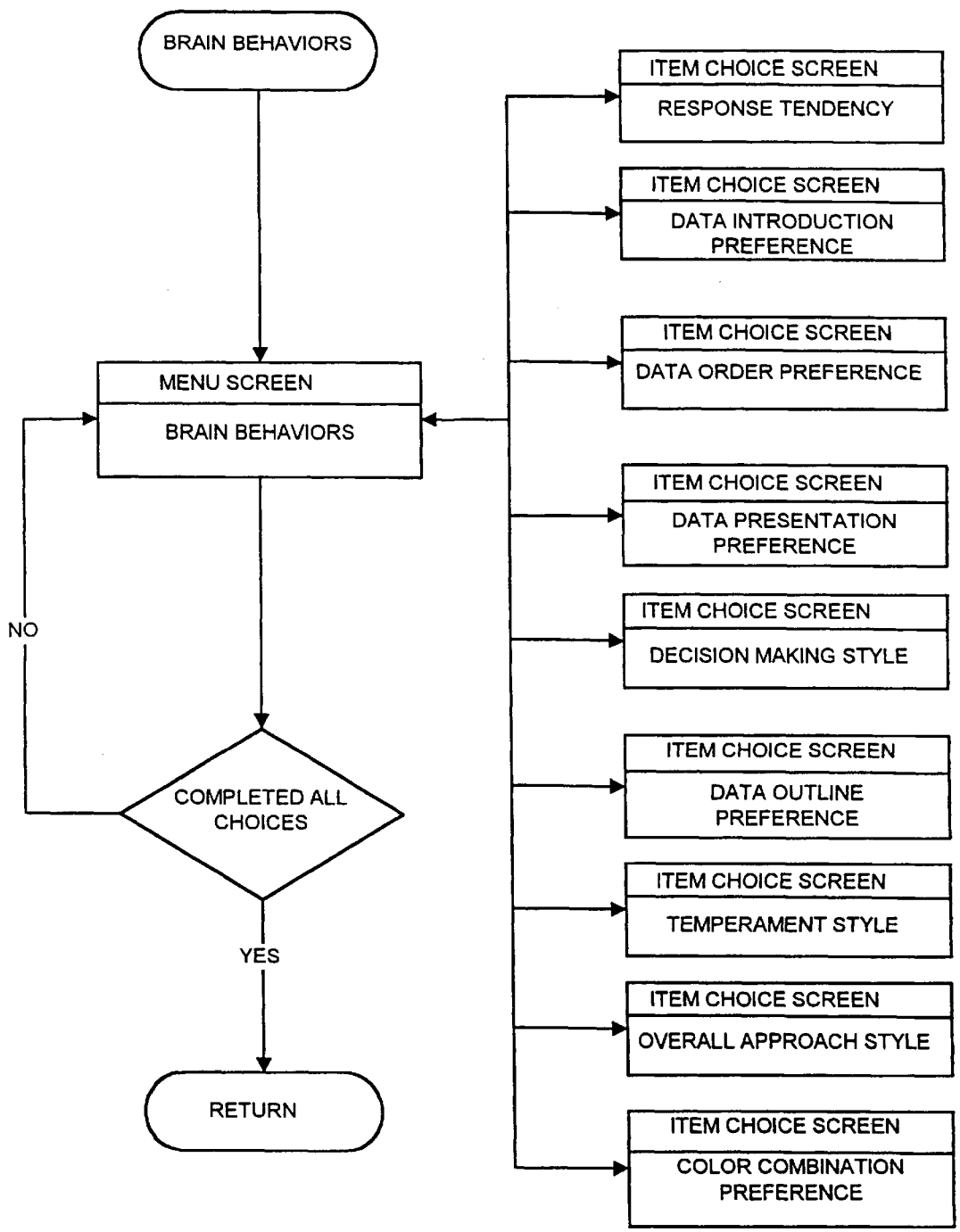
FIG. 9 is a flow chart illustrating the "brain behaviors" menus referenced in FIG. 5.

The program 80 explains to the user that the various learning traits to be measured have been grouped into categories. The program 80 further informs the user how to navigate through these categories. Subscreens introduce the six categories. A series of screens in each category presents options for the user to select preferences, and graphics and written text are used to present choices. A more detailed representation of the various category menus are illustrated in FIGS. 5–9. In particular, FIG. 5 illustrates the "Learning Traits Categories" menu, FIG. 6 illustrates the "Surroundings" menu referenced in FIG. 5, FIG. 7 illustrates the "Disposition" menu referenced in FIG. 5, FIG. 8 illustrates the "Natural Considerations" menu referenced in FIG. 5, and FIG. 9 illustrates the "Brain Behaviors" menus referenced in FIG. 5. The "Surroundings" category shown in FIG. 6 considers four factors, including sound, light, temperature and body position. The "Disposition" category shown in FIG. 7 considers four factors, including attitude, tenacity, conformity, and organization. The "People Mindedness" category (not illustrated) considers four factors, including along, with peers, with leader, or variety. The "Natural Considerations" category considers three factors, including food/drink, time of day, and movement. The "Perceptual Strengths" category (not illustrated) considers four factors, including auditory, visual, tactile, and kinesthetic. The "Brain Behaviors" category illustrated in FIG. 9 considers ten factors, including response style, data introduction preference, data order preference, information presentation preference, decision making process, data outline preference, temperament, overall approach style, and color preferences.

Turning to FIG. 3, the program 80 continues at block 100, wherein the user is given the choice of proceeding through the program with a guide or in a self-guided manner. For users that select the option of a guide, block 104 provides the user with a choice from an album. At block 106, the users begin a process of preference of selections from multiple source categories presented simultaneously. The options are presented using graphics and written text descriptions. Blocks 108–126 request from the user various preferences for receiving information and/or their particular work environment. At block 108 the user is presented with various working environment options. The user selects an area preferred for studying or working. At block 110 the user is presented with various lighting choices and to select a preference. At block 112 the user is presented with various seating choices (graphics and text) and asked to select the type they prefer when learning. At block 114 the user is presented with various sound choices and asked to select the type they prefer when learning or concentrating. At block 116 the user is presented with various temperature choices and asked to select which is preferred when learning or concentrating. At block 118 the user is presented with various choices regarding working alone or with others, and asked to select a preference. At block 120 the user is presented with several options as to how work or study materials are organized and asked to select a preference. At block 122 the user is presented with various methods for receiving directions and asked to indicate a preference. At block 124 the user is presented various reporting methods and asked to indicate a preference. At block 126 the user is presented with various ways to prepare assignments for presentation and asked to select a preference. At block 128 the user is presented with options for taking a break from work or studies. The user is asked to make location and activity choices. The block 128 concludes the data collection phase of the program.

At block 130 the program provides the user with options for presenting the various profile reports. The program presents four report options to the user. Each report option provides an explanation and recommendations for enhanced performance in learning and work situations. These four options include personal learning style profile, individual self-study report, individual classroom study report, or instructor report. The program exits at block 132.

Figure 10:
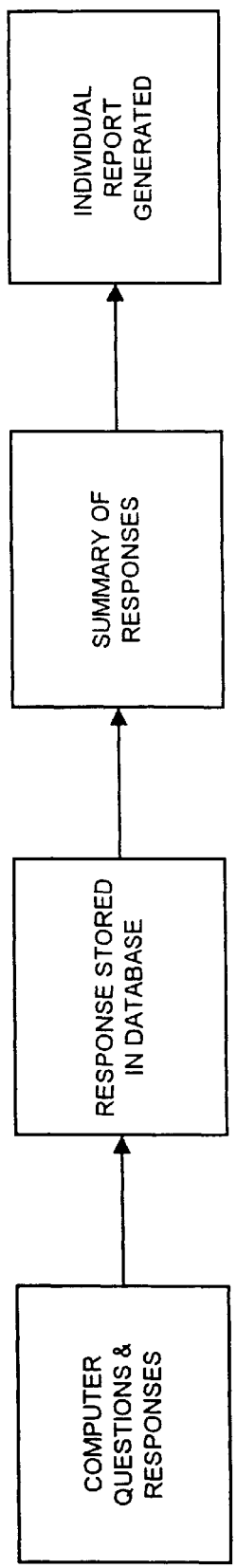
FIG. 10 is a flow diagram illustrating steps carried out by the computer of FIG. 1 when automatically generating an individual profile report in accordance with the method of the present invention.

FIG. 10 is a flow diagram illustrating steps carried out by the computer of FIG. 1 when automatically generating an individual profile report in accordance with the method of the present invention. The method automatically generates an individual learning style report by asking questions, presenting choices and recording the selections in a database. The recorded selections are accumulated for each learning factor and method of selection. This data is stored in a table format. Each cell in the table is weighted as to the importance of that factor to the individual and is linked to a corresponding narrative sentence describing the factor.

Figure 11:
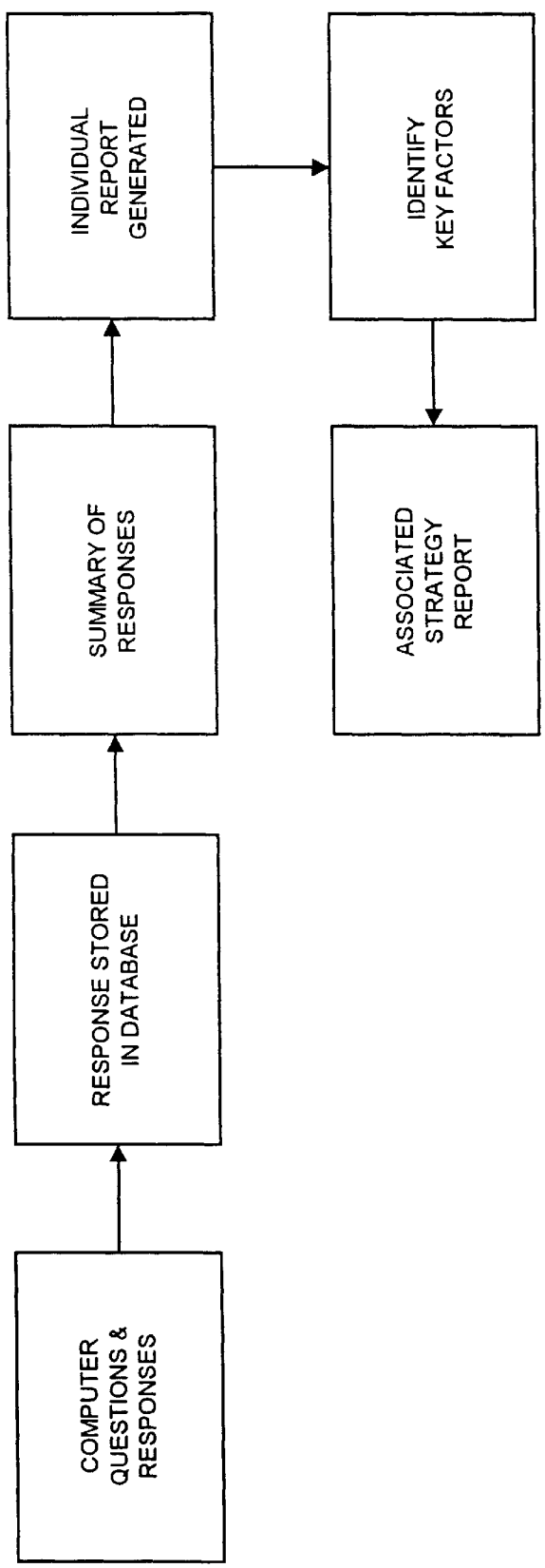
FIG. 11 is a flow diagram illustrating the steps carried out by the computer of FIG. 1 when automatically generating individual self directed study strategies reports in accordance with the method of the present invention.

FIG. 11 is a flow diagram illustrating the steps carried out by the computer of FIG. 1 when automatically generating individual self directed study strategies reports in accordance with the method of the present invention. The method automatically generates an individual learning style strategy report from the individual profile report by linking factor descriptions to appropriate strategies for each weighted factor. Each factor in the table has associated strategy texts.

Figure 12:
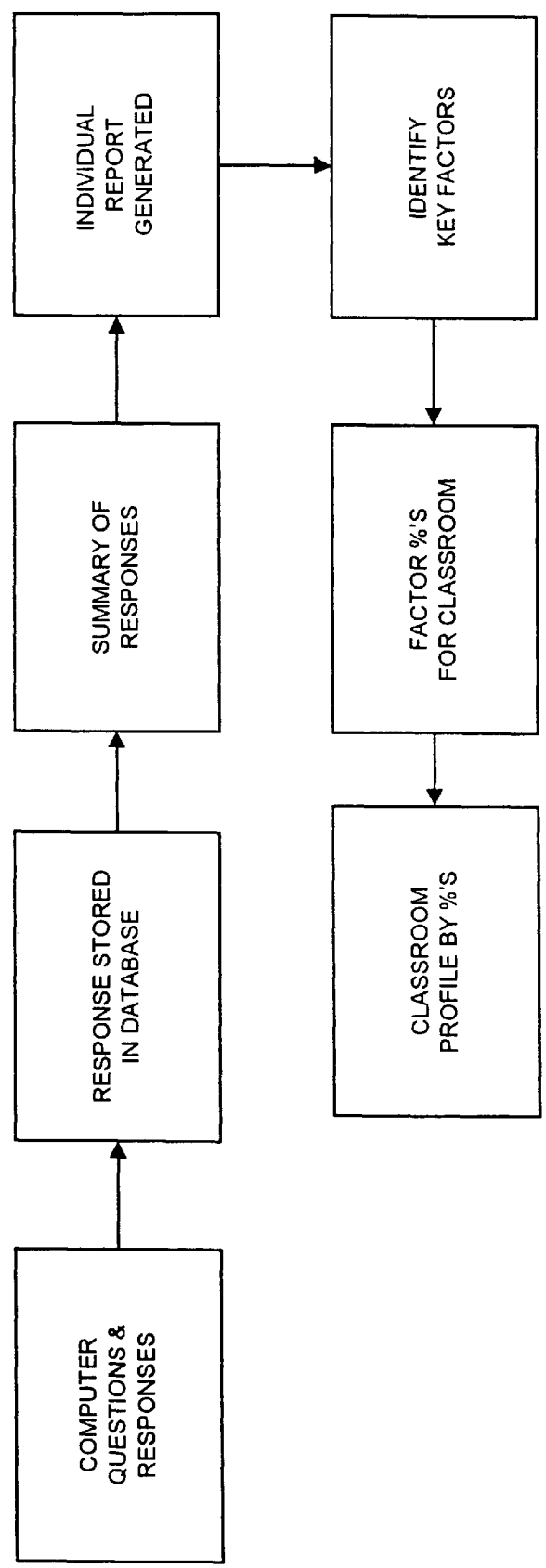
FIG. 12 is a flow diagram illustrating the steps carried out by the computer of FIG. 1 when automatically generating individual classroom instruction strategies reports in accordance with the method of the present invention.

FIG. 12 is a flow diagram illustrating the steps carried out by the computer of FIG. 1 when automatically generating individual classroom instruction strategies in accordance with the method of the present invention. The method automatically generates a classroom profile learning style report by grouping individual profile reports. The key factors are identified and class percentages determined. The classroom profile is generated from this compiled data.

Figure 13:
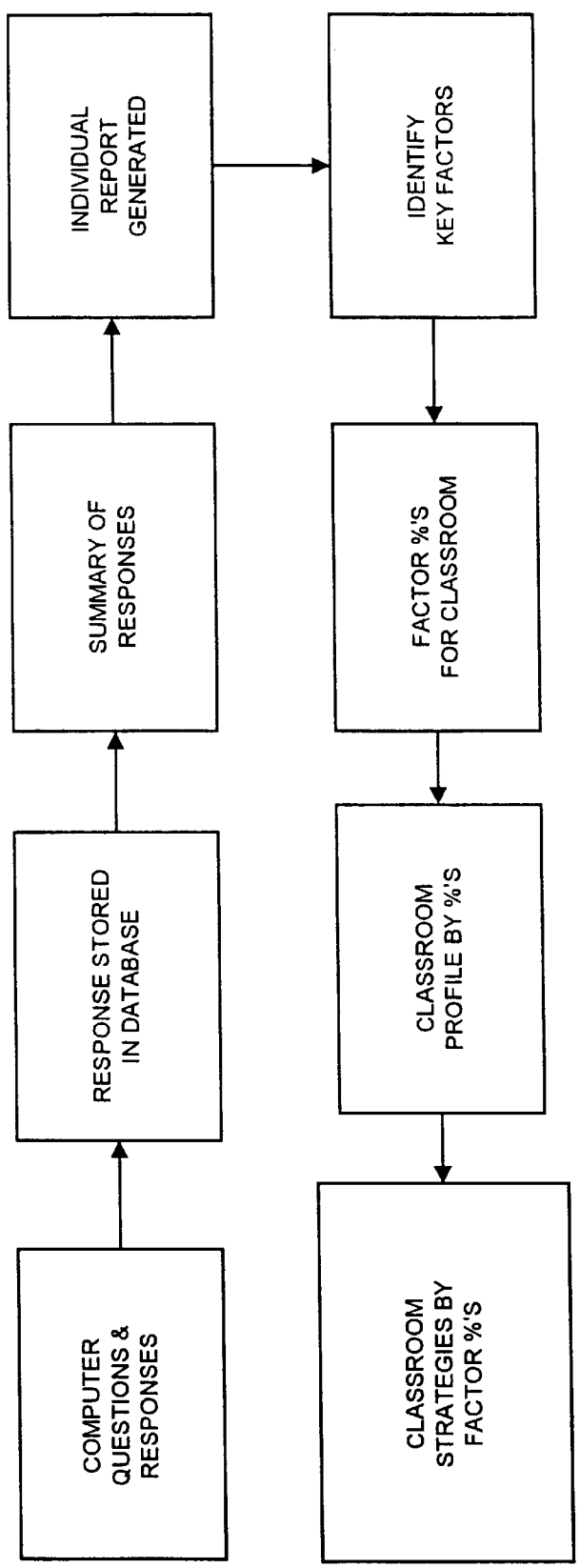
FIG. 13 is a flow diagram illustrating the steps carried out by the computer of FIG. 1 when automatically generating instructor teaching strategies for custom mixtures of student profiles in accordance with the present invention.

FIG. 13 is a flow diagram illustrating the steps carried out by the computer of FIG. 1 when automatically generating instructor teaching strategies for custom mixtures of student profiles in accordance with the present invention. The method automatically generates a classroom strategy report by grouping individual profile reports. The key factors are identified and class percentages determined. The classroom profile is generated from this compiled data. Key factors are assigned appropriate strategies in the classroom strategy report.

Figure 14:
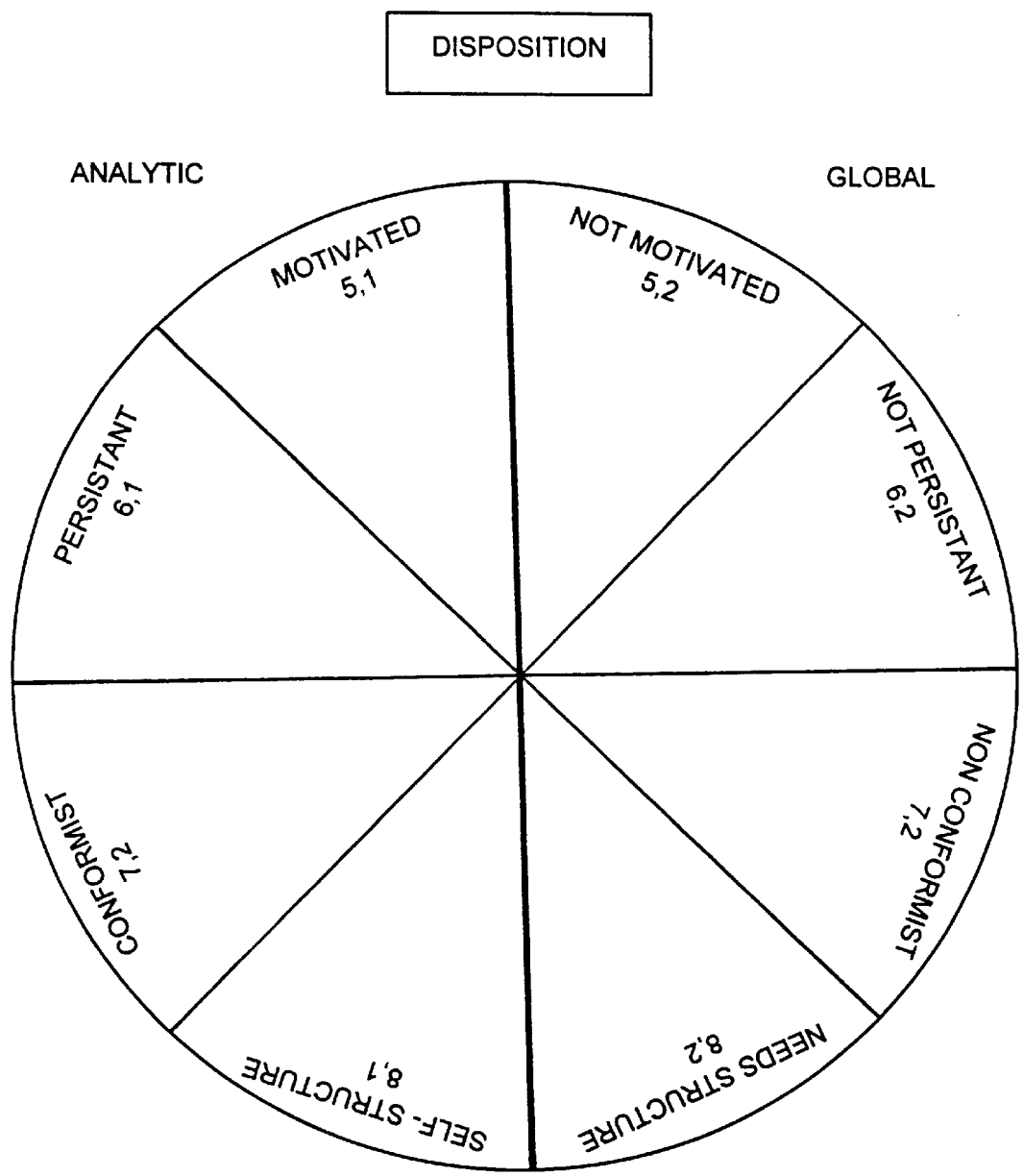
FIG. 14 is a pie chart illustrating how the scoring process records individual answers according to the present invention.

Referring now to FIGS. 14 and 15 the following is an explanation of the disclosed survey, data collection and scoring process utilizing the Disposition trait category. A learning style profile is comprised of an individual's personal factor preferences in several categories. Each category has multiple factors. The individual is presented a survey question for each factor and given multiple choice answers from which to select.

The Disposition trait category has four (4) factors, which are surveyed.

Motivation (Attitude)
Persistence (Tenacity)
Conformity (Conformity)
Structure (Framework)

For each factor, two (2) answer choices are presented. For the factor Motivation, the 2 choices are:

Motivated
Not Motivated

The individual's answer reflects their preference in regard to that factor, revealing that they are either Motivated or Not Motivated. The individual responses to each factor survey, combined with the answers from all factors, reveal an individual's unique learning style profile.

The scoring process records the individual's answers in two ways. First, answers reveal a specific preference. Second, answer choices are weighted as either n Global or Analytic learning characteristic (research has proven that certain preferences consistently align with right hemispherical dominance, Global, and others consistently align with left hemispherical dominance, Analytic.)

The pie chart shown in FIG. 14 provides a graphic of this process for the Disposition category. Each wedge of the chart represents the factor choices aligned by hemispherical dominance. The Analytical answer choices are illustrated on the left and the Global choices on the right half of the circle. The categories and factors are stored in database as shown in FIG. 15. Each factor is assigned a specific number and the number of answer choices for each factor is indicated by a decimal. Therefore, if the individual selection is Motivated, the data recorded and stored scores that answer choice in two ways:

(1) as a preference for Motivated;
(2) as an Analytic learning characteristic.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method for modeling learning styles, comprising:

defining a learning style survey to be administered to a person to be analyzed for modeling of a learning style;

grouping learning traits of the defined learning styles survey into categories to be measured;

presenting one or more displays to enable the person to be analyzed to select preferences for choices of graphics and written text;

selecting factors from various categories using graphics and written text for the learning traits of the defined learning style survey;

presenting to the person to be analyzed options on how to organize work or organize study materials;

presenting to the person to be analyzed preferences for selection from various report formats;

presenting to the person to be analyzed various options for preparing a profile report for the modeled learning style;

selecting by the person to be analyzed choices from the presented options and preferences; and generating a learning style model in response to the selection of options and preferences.

2. The method for modeling learning styles as in claim 1 further comprising presenting to the person to be analyzed information on individual techniques for using the categories of learning traits of the defined learning style survey.

3. The method for modeling learning styles as in claim 2 further comprising presenting to the person to be analyzed working environment preferences including working alone or with others.

4. The method for modeling learning styles as in claim 1 further comprising presenting to the person to be analyzed a selection of various seating choices.

5. The method for modeling learning styles as in claim 1 further comprising presenting to the person to be analyzed various sound choices for selection while learning.

6. The method for modeling learning styles as in claim 1 further comprising presenting to the person to be analyzed various temperature choices for selection while learning during the administration of the learning style survey.

7. The method for modeling learning styles as in claim 1 further comprising presenting to the person to be analyzed various options for taking a break from work or studies.

8. The method for modeling learning styles as in claim 1 further comprising presenting to the person to be analyzed various working environment options for selection during administering the defined learning styles survey.

9. The method for modeling learning styles comprising:
   defining a learning style survey to be administered to a person to be analyzed for a modeling of learning styles;
   grouping learning traits of the defined learning style survey into categories to be measured, the categories selected from one or more of the group comprising: learning traits; surroundings; disposition; natural considerations; and brain behaviors;
   presenting one or more displays to enable a person to be analyzed to select preferences for choices of graphics and written text;
   selecting factors from various categories using graphics and written text;
   presenting to the person to be analyzed options on how to organize work or organize study materials;
   presenting to the person to be analyzed preferences for selection from various reports;
   presenting to the person to be analyzed various options for preparing a profile report presenting a modeled learning style;
   selecting by the person to be analyzed choices from the presented options and preferences; and
   generating a learning style model in response to the selection of options and preferences.

10. The method for modeling learning styles as in claim 9 wherein factors of the category surroundings comprises:
    sound level;
    light level;
    temperature; and
    body position.

11. The method for modeling learning styles as in claim 9 wherein factors of the category disposition comprises:
    attitude;
    tenacity;
    conformity; and
    framework.

12. The method for modeling learning styles as in claim 9 when factors of the category natural considerations comprises:
    a choice of food and drink;
    a choice of time of day; and
    a choice of natural movement.

13. The method for modeling learning styles as in claim 9 wherein factors of the category brain behavior comprises:
    response tendency;
    data introduction preference;
    data order preference;
    data presentation preference;
    decision making style;
    data outline preference;
    temperament style;
    overall approach style; and
    color combination preference.

14. The method for modeling learning styles as in claim 9 further comprising a learning traits category summary comprising:
    individual profile;
    individual study strategies;
    individual classroom strategies; and
    instructor strategies.

15. The method for modeling learning styles as in claim 9 further comprising a perceptual strengths category comprising:
    auditory;
    visual;
    tactile; and
    kinesthetics.

16. The method for group modeling learning styles, comprising:
    recognizing a group of persons to be analyzed as a group for learning style;
    defining a learning style survey to be administered to each person of the group to be analyzed;
    grouping learning traits of the defined learning style survey into categories to be measured;
    presenting one or more displays to enable each person of the group to be analyzed to select preferences for choices of graphics and written text;
    selecting factors for various categories using graphics and written text;
    presenting to each person of the group to be analyzed options on how to organize work or organize study materials;
    presenting to each person of the group to be analyzed preferences for various methods for selection;
    presenting to each person of the group to be analyzed various options for preparing profile reports;
    selecting by the person to be analyzed choices from the presented options and preferences; and
    generating a learning style model in response to the selection of options and preferences.

17. The method for modeling learning styles as in claim 16 wherein the categories comprise:
    surroundings;
    disposition;
    peoplemindedness;
    natural considerations;
    perceptual strengths; and
    brain behaviors.

18. The method for modeling learning styles as in claim 17 further comprising a categories summary comprising:
    individual profile;
    individual study strategies;
    individual classroom strategies; and
    instructor strategies.

* * * * *

UNITED STATES PATENT AND TRADEMARK OFFICE
CERTIFICATE OF CORRECTION

PATENT NO.    : 6,285,993 B1                                                Page 1 of 1
DATED         : September 4, 2001
INVENTOR(S)   : Joe G. Ferrell It is certified that error appears in the above-identified patent and that said Letters Patent is hereby corrected as shown below:

<u>Title page, Item [54] and Column 1, line 1,</u>
Delete "METHOD AND APPARATUS FOR MODELING INDIVIDUAL LEARNING STYLES" and insert -- RULE-BASED METHOD AND APPARATUS FOR MODELING INDIVIDUAL LEARNING STYLES --.

<u>Column 10,</u>
Line 46, after "by", delete "the", and insert -- each --.
Line 46, after "person", insert -- of the group --.

Signed and Sealed this

Thirtieth Day of July, 2002

*Attest:*

*Attesting Officer*

JAMES E. ROGAN
*Director of the United States Patent and Trademark Office*